HIGHLY SENSITIVE EXPOSURE METER

Filed Oct. 25, 1961 4 Sheets-Sheet 1

INVENTORS:
Hans Foersterling
Erwin Pfaffenberger
Richard Schoeheinz
BY
Nolte & Nolte
ATTORNEYS HIGHLY SENSITIVE EXPOSURE METER
Filed Oct. 25, 1961 4 Sheets-Sheet 2
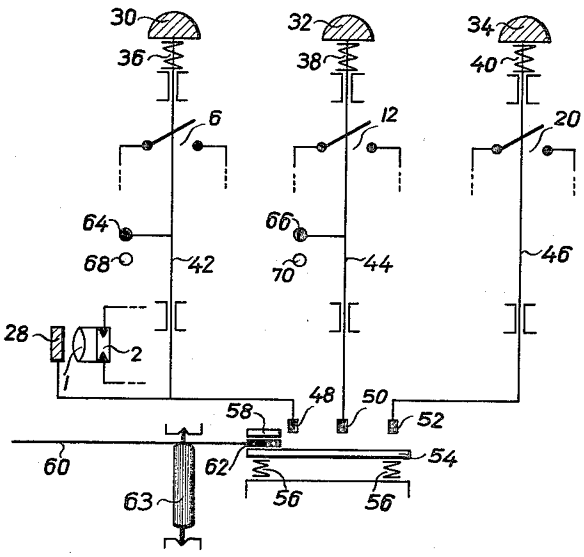
Fig. 4
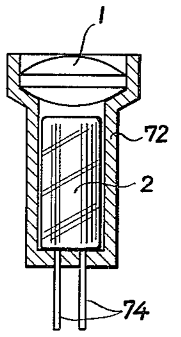
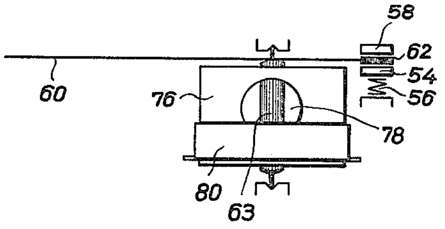
Fig. 5 Fig. 6
INVENTORS:
Hans Foersterling
Erwin Pfaffenberger
BY Richard Schoenheinz
Nolde & Nolte
ATTORNEYS

HIGHLY SENSITIVE EXPOSURE METER

Filed Oct. 25, 1961 4 Sheets-Sheet 3

INVENTORS:
Hans Foersterling
Erwin Pfaffenberger
Richard Schoenheinz
BY Nolte & Nolte
ATTORNEYS

HIGHLY SENSITIVE EXPOSURE METER

Filed Oct. 25, 1961 4 Sheets-Sheet 4

INVENTORS:
Hans Foersterling
Erwin Pfaffenberger
Richard Schoenheinz
BY
Nolte & Nolte
ATTORNEYS 3,218,917

HIGHLY SENSITIVE EXPOSURE METER

Hans Foersterling, Koldestrasse 23; Erwin Pfaffenberger, Bohlenplatz 9; and Richard Schoenheinz, Elbestrasse 5, all of Erlangen, Upper Bavaria, Germany Filed Oct. 25, 1961, Ser. No. 147,547
Claims priority, application Germany, Mar. 23, 1961, G 31,883
2 Claims. (Cl. 88—23)

This invention relates to highly sensitive exposure meters used primarily in black and white or color photography, cinematography, etc.

Usually a photoelectric cell is used as the light sensitive element in the known devices for the above mentioned purposes. A constant trend in the marketing of photosensitive materials, such as black and white and other films, is towards materials having a greater sensitivity and higher speed. Due to the relative insensitivity of known exposure meters, difficulties have arisen when it was attempted to use existing exposure meters with the new, high speed film materials. Exposure meters using photoelectric cells as their photosensitive element can be used to measure brightness values down to about 0.089 candle per square foot or in case of light intensity measurements down to a minimum of 1.85 foot-candles. Since the newly marketed film materials are suitable for use at very low ambient illumination levels, the known exposure meters will not produce any deflection of the indicator at such low levels.

According to one known method, the minimum sensitivity of the known exposure meters can be increased by providing additional photoelectric cells or boosters connected in parallel with the main photoelectric cell. With the arrival of even more sensitive film materials on the market, these have become inadequate. In addition, such booster-equipped exposure meters are unwieldy and difficult to handle.

According to another known method, photo-current amplifiers can be used to amplify the weak signal generated by the light reaching the photoelectric cell. This solution has several drawbacks in that it requires complicated adjustments such as temperature compensation, etc., and this solution would result in a device of high cost, making it difficult for an amateur to obtain. The presence of a photocurrent amplifier also seriously impairs the portability of such an exposure meter.

Accordingly, the primary object of the present invention is to provide a highly sensitive exposure meter being of light weight and of a portable nature.

Another object of the invention is to provide a versatile exposure meter permitting both brightness and light intensity measurements.

Another object of the invention is to render the exposure meter capable of measuring brightness and intensity over a very wide range by utilizing one or more subranges within the principal measuring range.

Another object of the invention is to provide accurate readings of the exposure meter by providing means to calibrate and adjust every one of the subranges.

Another object of the invention is to provide means by which the condition of the battery can be tested to indicate when a replacement of the battery is due.

Another object of the invention is to provide means by which the operator of the device can easily recognize which one of the scales of the readout portion has to be used for the given illumination level.

Another object of the invention is to provide an arresting mechanism for the pointer so that various mechanical interferences resulting from portability, abuse or just general operation will not damage the sensitive mechanical components of the exposure meter.

Other and further objects and advantages of the invention will be obvious upon an understanding of the illustrative embodiment about to be described. Other features and advantages not referred to herein will occur to one skilled in the art.

In accordance with the present invention, it has been found that the foregoing objects can be accomplished by using a photoresistor as the light sensitive element, because in this case the source for the electrical current is not generated by the light-sensitive element but by an extra source of power, specifically a small button-cell or battery. The resistance of the photoresistor varies in proportion to the light intensity reaching it. The changing resistance limits the current of the circuit accordingly and this can be read by a meter. Several subranges can be provided in order to expand the scale and increase sensitivity. Such subranges can be controlled by pushbuttons, and the circuitry of each subrange includes means for adjusting and calibrating the scale of the corresponding subrange. A subcircuit can be provided for battery checking purposes to show when a replacement is due.

It should be emphasized that in order to accomplish the required broadening of the general measurement range, it is not satisfactory alone to exchange the photoelectric cell of known exposure meters with a photoresistor and a battery, because by reason of the physical properties of photoresistors, difficulties can arise which can be surmounted only by the inventive considerations of the present invention.

The exposure meter of the present invention has two measurement subranges in its preferred embodiment, the minimum sensitivity in case of brightness measurements is at about 0.00074 candle per square foot, or in case of light intensity measurements at about 0.014 foot-candle. The meter of the preferred embodiment is capable of measuring within a range starting from the above mentioned minimum value, the range encompassing the ratio of 1:1,000,000 in about 20 calibrated step values within the two subranges.

There are two subranges in order to facilitate the reading of the values indicated and also to provide better electrical control of the instrument. The two subranges of the preferred embodiment can be represented on the same readout portion, in form of two adjacent calibrated scales. In order to provide coinciding scale divisions for both subranges, a special circuit having special equalization means was developed, which, according to the invention, is characterized by a circuit comprising a plurality of groups of series resistances, the groups being connected in parallel to each other, and the number of such groups of resistances equalling the number of measuring subranges.

Further special features of the meter of this invention include a special switching mechanism which is coupled to an arresting means for a pointer; a battery voltage testing circuit; a diffusing sphere for light intensity measurement; a special magnetic shunting on the measuring movement for calibrating purposes and a special mounting for the photoresistor.

In the following, reference is made to the accompanying drawings wherein:

FIG. 4 illustrates the switches and their coupling to the pointer arresting system;

FIG. 5 shows the housing of the photosensitive element;

FIG. 6 shows the meter movement;

Figure 1:
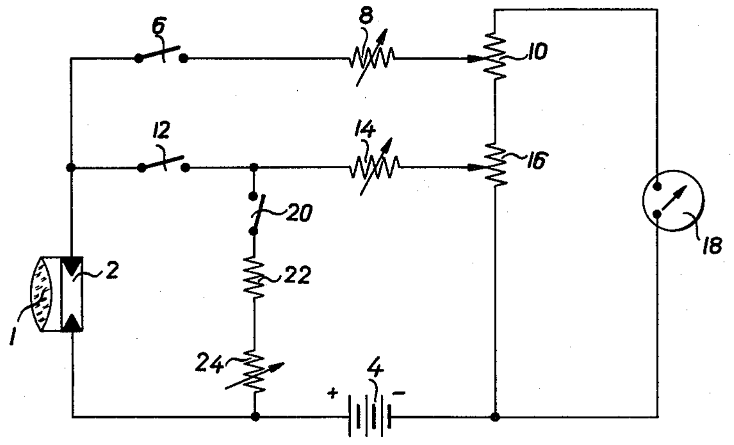
FIG. 1 is a schematic representation of the electrical circuit.

In the electrical circuit of the embodiment having two subranges shown in FIG. 1, lens 1 is located in front of the light admitting opening of a photoresistor 2, one side of which is connected to battery 4, the other side being connected through a normally open pushbutton switch 6 and resistors 8 and 10 (measuring subrange I for lower light intensity), or through a normally open pushbutton switch 12 and resistors 14 and 16 (measuring subrange II for higher light intensity) to an indicating instrument 18. A switch 20 permits the introduction of resistors 22 and 24 into the circuit for battery checking purposes.

Resistors 8, 10, 14, 16 and 22 are preferably small size film-type potentiometers and allow calibration of the instrument, as described later.

FIG. 1 is further explained by reference to FIGS. 2 and 3.

Figure 2:
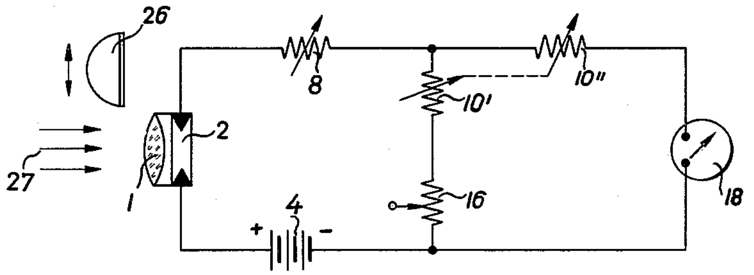
FIG. 2 is a schematic representation of the lower light intensity measuring subrange, (II) shown in FIG. 1.

FIG. 2 shows the components of the circuit which are connected upon the activation of switch 6 (for measuring subrange I) wherein the potentiometer 10 is represented by its two resistance portions, 10′ and 10″. A diffusing sphere 26 can be moved in front of the light admitting opening of the photoresistor 2 in the case when light intensity measurement is desired. The light enters from the direction indicated by arrows 27. The diffusing sphere and its manner of attachment will be described later.

Figure 3:
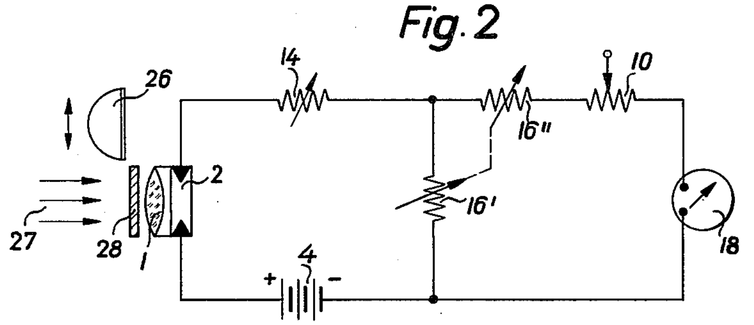
FIG. 3 is a schematic representation of the higher light intensity measuring subrange, (II) shown in FIG. 1.

FIG. 3 shows the path of the current when switch 12 (for measuring subrange II) is closed, wherein the potentiometer 16 is represented by its two resistance portions 16′ and 16″. A neutral filter 28 is positioned in front of the light admitting opening of the photoresistor 2 so as to absorb a portion of the light entering from the direction indicated by the arrows 27. In the preferred embodiment, the neutral filter 28 reduces the amount of entering light to about $\frac{1}{50}$ of the initial light intensity.

The exposure meter is equipped with an arresting mechanism for its pointer 60, as shown in FIG. 4, i.e. a device which renders the indicating pointer immovable when the device is not being operated, and allows the pointer to be freed or disarrested for operation. The pointer can be arrested by de-activating any one of the switches 6, 12 or 20. All of these three switches are of the normally open type as biased by springs 36, 38 and 40. The lower ends of switching posts 42, 44 and 46 are provided with abutting portions 48, 50 and 52. Normally, these abutting portions are located a short distance away from a pointer arresting press-plate 54. Press-plate 54 is biased by springs 56 toward an arresting block 58. The pointer 60 has an arresting portion 62 which in the arresting position is pinched between pressing plate 54 and arresting block 58. In this manner, the pointer 60 is prevented from moving. The pointer 60 is attached to a rotating shaft 63.

Figure 9:
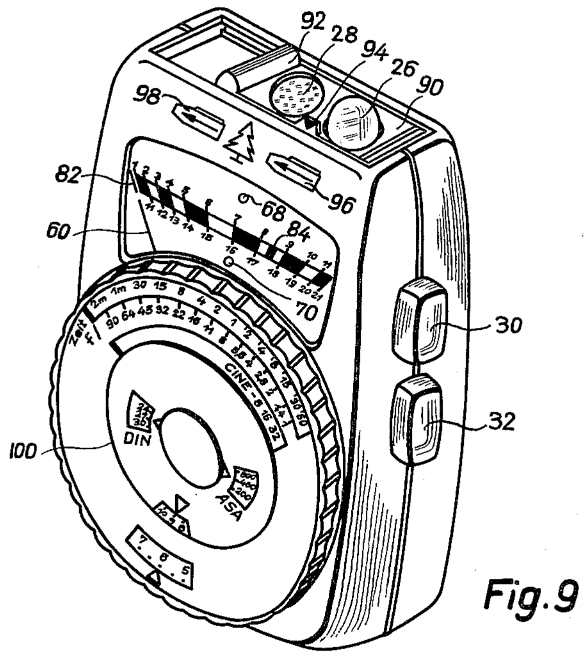
FIG. 9 is an elevational view of the complete instrument showing its front and one side.

Switching posts 42 and 44 carry respectively colored markings 64 and 66, and when either of pushbuttons 30 or 32 of switch 6 or 12 is pressed, the respective one of colored marking 64 or 66 appears in a window 68 or 70. The location of these windows is best shown in FIG. 9 and they serve to show to the operator of the instrument which one of the scales he has to consider when a given subrange is activated for measurement.

When either one of pushbuttons 30, 32 or 34 is activated, the abutting portion 48, 50 or 52 presses upon press plate 54 against the bias of springs 56, thus relieving the pressure from arresting block 58 and arresting portion 62. The pointer 60 becomes disarrested and is free to pivot around its axis. The pointer stays free as long as the pushbutton in question is depressed and becomes arrested as soon as the pushbutton is released.

Normally, i.e., in the inoperative position, the neutral filter 28 always covers the light admitting opening of the photoresistor 2. The reason for this is that photoresistors have various resistance and response characteristics, according to whether they were kept in dark when not in operation or whether they were more or less illuminated during such period. Therefore, it is required that the photoresistor should be exposed to light preferably only during the measurement itself.

If it is desired to make a measurement on the scale for lower light intensity, subrange I is activated by pressing the button 30 of switch 6. The abutting portion 48 presses against pressing plate 54, the pointer 60 is released and deflects to a certain scale value. Furthermore, the colored mark 64 appears in window 68. At the same time, filter 28 swings away from the opening, caused by a suitable mechanical coupling to the switch 30 and allows the light to enter unabsorbed through lens 1 to photoresistor 2.

When, after the pointer deflected to the desired scale position, pushbutton 30 is released and the pointer can be arrested to lock at the deflected position. This results in the further advantage that the instrument does not have to be activated for any longer period, because the measured value can be locked until the pointer is released again. This permits the use of the battery only for a brief period and consequently also the photoresistor will be exposed to light only for a correspondingly brief period.

If one wishes to make a measurement on subrange II, in the case of higher light intensity, button 32 has to be pushed, thereby switch 12 becomes closed, the abutting portion 50 presses against press-plate 54 and frees the pointer 60. The colored mark 66 appears in window 70. In this case, the filter 28 remains in front of the light-admitting opening, so that the entering light is reduced to about $\frac{1}{50}$ of the initial light intensity.

When it is desired to check the battery, whether its output is still satisfactory or whether it needs replacement, the push button 34 of switch 20 is depressed. Thereby switch 20 closes the abutting portion 52 pressed against press plate 54 and frees pointer 60. If the battery can supply the required output, that is, it is not yet exhausted, then the pointer has to deflect to a certain marking 84 provided on the scale, to be further described hereunder.

FIG. 5 shows the manner of mounting of the lens 1 and photoresistor 2 in a light-tight housing 72. Such a housing is described in greater detail in the copending application, Serial No. 137,430, by Pfaffenberger, filed on September 11, 1961. It is important that these components should be mounted according to the description referred to above, since the arrangement of the components is very sensitive and any stray light hitting the photoresistor will materially influence the measured value. Leads 74 of the photoresistor 2 are also arranged in a light-tight manner.

The measuring movement is shown in FIG. 6. The movement is of the magnetic core type where an outer ring 76 has a round hole 78 to accomplish a desired response of the movement. A slidable soft-iron ring 80 surrounds the outer ring 76. The soft-iron ring 80 serves as an adjustable magnetic shunting for calibration and adjustment of the instrument 18 as to be described in the following.

Figure 7:
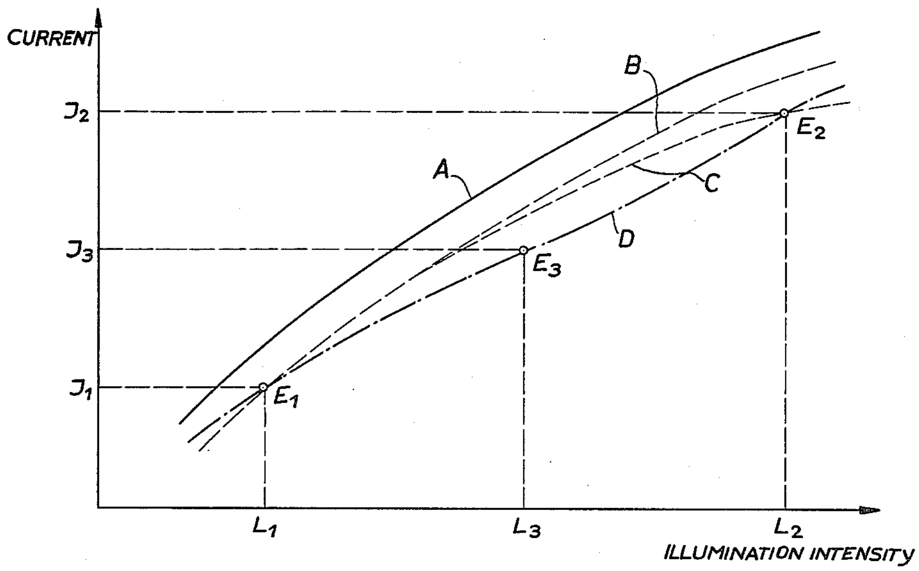
FIG. 7 is a diagram illustrating the method of calibration of the instrument.

Resistors 8, 10, 14 and 16 can be used for the calibration and adjustment of the instrument. FIG. 7 shows how the response curve of an unadjusted instrument can be made to fit standard calibration points.

A certain amount of circulating current corresponds to a given illumination intensity. The ordinate and the abscissa of the diagram in FIG. 7 show these parameters.

Three calibrating points $E_1$, $E_2$ and $E_3$ are shown to which, in case of illumination intensities $L_1$, $L_2$ and $L_3$, respective currents $J_1$, $J_2$ and $J_3$, correspond. Let us assume that an exposure meter which was just fabricated and has not yet been calibrated, has the response characteristics represented by curve A, which as shown in FIG. 7 does not go through any one of the standard calibrating points. The calibration of such an instrument is done in the following manner:

Measuring subrange I is activated by closing switch 6 and then potentiometer 10 is adjusted in such a direction as to result in a parallel shift in curve A towards the direction of calibration point $E_1$ until curve A intersects this point. The resulting response curve is marked B in FIG. 7. Next, variable resistor 8 is changed so that the response curve will tilt and intersect the calibration point $E_2$ to result in the curve C as shown in FIG. 7. Subsequently the magnetic shunt 80 is adjusted to bring the response curve through calibration point $E_3$. The resulting response curve is shown by D on FIG. 7. Since subranges I and II slightly overlap, it is sufficient to adjust only resistances 16 and 14 when subrange II is connected, without necessitating any adjustment of the magnetic shunt 80.

Figure 8:
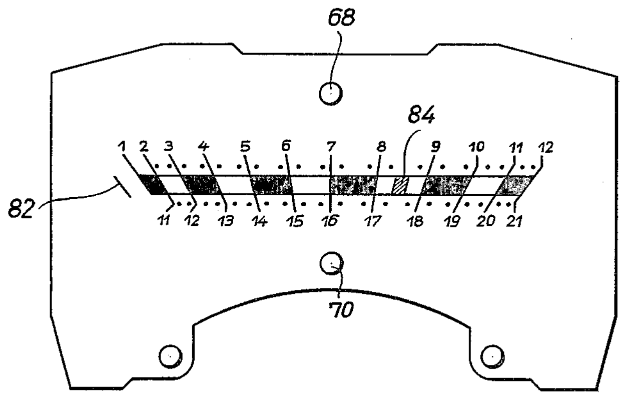
FIG. 8 shows the readout portion, including the two scales of the two subranges of the preferred embodiment.

The readout portion of the instrument is shown in FIG. 8. On it, the so-called light values 1 to 12 and 11 to 21 are shown on the two scales. Outside the just mentioned values is the marking 82 which serves for the adjustment of the mechanical zero of the movement. The marking 84 is for battery checking purposes. As mentioned, the pointer of the instrument has to deflect to this marking when the button 34 is depressed. The window 68 corresponds to the upper scale (1 to 12) of the lower subrange (I) while the window 70 corresponds to the lower scale (11 to 21) of the higher subrange (II).

The exposure meter is suited to measure two basic types of illuminations: (a) brightness and (b) intensity (also referred to in popular usage as direct or incident and indirect or reflected light).

In case of brightness measurement the amount of light is measured that is reflected from the object or objects to be photographed. In this case it is desired that the light reaching the photoresistor should enter from a relatively small angle.

On the other hand, when light intensity is being measured, one can obtain a measure of the available light in a given place and not necessarily from the object or objects photographed. In this case, the light from a relatively wide angle has to be gathered. In case of light-intensity measurement, the light has to be diffused. Flat diffusers do not gather in light from relatively large angles such as 180 degrees and for this reason the diffusers generally used in such cases are of hemispherical or similar shape, having the generic name "diffusing sphere."

Figures 10, 11:
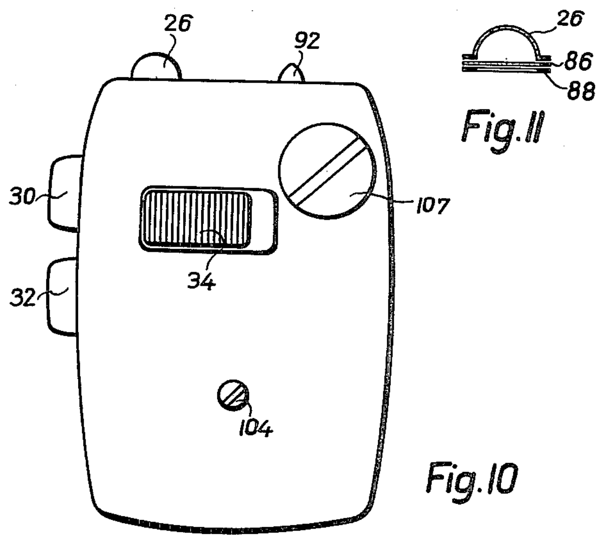
FIG. 10 is a rear elevational view of the instrument.
FIG. 11 shows the construction for standardization of the diffusing sphere.

In the fabrication of such diffusers, it is not always easy to control the transmission and the diffusing characteristics of the fabricated body and therefore it is necessary to standardize such diffusers after fabrication. FIG. 11 shows how much a standardization can be made according to the preferred embodiment of the invention. A flat plate 86 is placed below the diffusor 26. The plate 86 is made of a good diffusing material having favorable transmission and angular diffusing properties. If the total transmission of the diffusing sphere 26 and diffusing plate 86 is higher than required, standardization is accomplished by placing a diaphragm 88, having a suitable-size opening under the plate 86.

As shown in FIG. 9, the standardized diffusing arrangement of FIG. 11 is mounted on a sliding member 90, having a handle portion 92. The sliding member 90 is mounted onto the housing of the instrument preferably in such a manner that it cannot fall off or get lost. A marking 94 is provided on the sliding member 90 which, according to the position thereof, indicates to either arrow 96 or arrow 98. Arrow 96 points towards the object (tree) to be photographed and arrow 98 points away from the object. This is a quick indication to the operator whether the diffusing sphere is in front of the light admitting opening or is not. This way the operator can see whether for the type of measurement he desired to make, sliding member 90 has to be moved or not.

A known conversion device 100 is located below the readout portion and this device may be used to determine the various photographic parameters, such as lens speed, diaphragm opening for a given type of film from the light value indicated by the pointer on one of the scales.

As shown in FIG. 10, knob 34 is located on the rear of a housing and has knurled sliding portion flush or recessed with regard to the rear surface. A screwed-on lid 107 covers the battery 4 permitting an effortless replacement thereof when needed. An adjusting screw 104 is used to adjust the mechanical zero (82) of the movement.

As various changes may be made in the form, construction and arrangement of the parts herein described without departing from the spirit and scope of the invention, it is to be understood that all matters described herein are to be interpreted as illustrative and not in any limiting sense.

We claim:

1. An exposure meter having a plurality of measuring ranges, comprising a photo-resistor connected in a normally open circuit with a battery and a current meter adapted to provide an exposure reading dependent on the current flow therethrough, a first plurality of series-connected calibrating resistances connecting across said meter, the number of resistances being equal to the number of measuring ranges, each of said resistances including a movable tap, and separate switches connected from each of said movable taps for selectively closing said normally open circuit, a second plurality of variable resistances connected in series with each of said switches wherein said second resistors may be varied to adjust the response of the meter whereby the measuring range of the exposure meter may be selected by operation of said switches.

2. An exposure meter according to claim 1 wherein said current meter includes calibrating means for further adjusting said response characteristics.

References Cited by the Examiner

UNITED STATES PATENTS

| | | | |
|---|---|---|---|
| 2,073,790 | 3/1937 | Goodwin | 88—23 |
| 2,111,585 | 3/1938 | Falge | 88—23 |
| 2,143,500 | 1/1939 | Smethurst et al. | 88—23 |
| 2,167,803 | 8/1939 | Graham et al. | 88—23 X |
| 2,275,344 | 3/1942 | Gernhard et al. | 88—23 |
| 2,389,617 | 11/1945 | Freund | 88—23 |
| 2,472,381 | 6/1949 | McMaster | 88—23 |
| 2,475,108 | 7/1949 | Nicholson | 88—23 |
| 2,501,599 | 3/1950 | Eltenton et al. | 88—14 X |
| 2,630,735 | 3/1953 | Rouy | 250—220 X |
| 2,766,654 | 10/1956 | Stimson et al. | 88—23 |
| 2,820,215 | 1/1958 | Hughes | 250—206 |
| 2,891,438 | 1/1959 | Fuhrmann et al. | 88—14 |
| 2,892,378 | 6/1959 | Canada | 88—14 |
| 2,987,957 | 6/1961 | Lovegrove | 88—23 |

FOREIGN PATENTS

| | | |
|---|---|---|
| 952,002 | 4/1949 | France. |

JEWELL H. PEDERSEN, *Primary Examiner.*